Figures 1, 2:
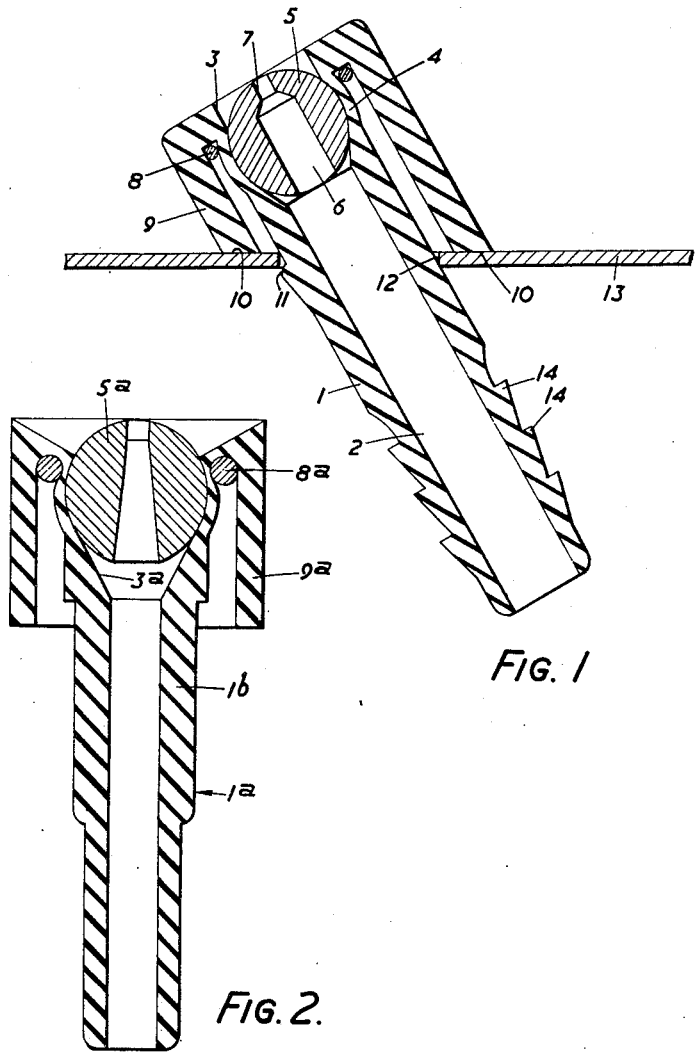

Dec. 11, 1962     C. W. HEATH     3,067,955
SPRAY OR JET ASSEMBLIES FOR SPRAYING LIQUID
Filed Sept. 8, 1961

INVENTOR
CLARENCE WILLANS HEATH,
BY Walter P. Jones
ATTORNEY 3,067,955
SPRAY OR JET ASSEMBLIES FOR SPRAYING LIQUID
Clarence Willans Heath, Bleasby, England, assignor to United-Carr Fastener Corporation, Boston, Mass., a corporation of Delaware
Filed Sept. 8, 1961, Ser. No. 136,868
Claims priority, application Great Britain Sept. 8, 1960
1 Claim. (Cl. 239—587)

This invention relates to a spray or jet assembly for spraying liquid for example over the windscreen of a motor car.

The invention is more particularly concerned with a spray or jet assembly comprising a body in which is mounted a ball or like shape member formed with a bore which constitutes the jet through which liquid is ejected.

According to the present invention a spray or jet assembly comprises a hollow body made of resilient pliable material formed at one end with a recess housing a ball or like shaped member having a diametral bore which constitutes a jet for the liquid to be sprayed, the ball or the like being retained in the recess by a clip positioned round the wall of the hollow body so as to compress the wall inwardly. The wall of the recess is relatively thin and resilient so that the ball can be forced or sprung into the recess, the wall flexing or expanding outwardly to accommodate the ball which is secured by means of the spring clip or the like positioned round the outer wall of the recess at a location above the transverse diameter of the ball. The ball will accordingly be held securely in the recess but will be capable of rotation to adjust the position of the jet relative to the article to be sprayed with liquid.

The body is adapted to be connected with a supply of liquid by means of a pipe, one end of which is connectible to the end of the body remote from the ball or the like.

One embodiment of the invention as applied to a jet or spray forming a washer unit for the windscreen of a motor vehicle is illustrated in the accompanying drawings in which:

FIGURE 1 is a sectional view of a spray jet assembly, according to one embodiment of the invention, and FIGURE 2 is a sectional view of a modified assembly.

As shown in FIGURE 1 of the drawings, the assembly includes a hollow body 1 made of resilient pliable material such as polythene and formed with an axially extending passage-way 2. At one end a recess 3 is provided aligned with the passageway and having a relatively thin resilient or flexible peripheral wall 4. A ball 5, preferably of metal and having a diametrically extending bore 6 terminating in a jet aperture 7, is assembled in the recess. As the wall 4 of the recess is relatively thin and pliable it will readily flex outwardly as the ball is forced in so that the wall 4 will be deformed into the shape shown in the drawing to embrace the arcuate surface of the ball. As shown the inner end of the recess 3 is of arcuate shape corresponding to the surface of the ball. The ball is retained by means of a spring clip 8 which encircles the outer wall 4 of the recess at a position above the transverse diameter of the ball. The ball will accordingly be securely held but not so rigidly as to prevent it being rotated, if desired, to position a jet aperture 7 at the correct angle to a windscreen which is to receive a jet of liquid.

As shown the upper end of the body is also provided with an integral sleeve 9 extending axially over the recess and the adjacent part of the body in spaced parallel relation thereto, the lower free end 10 of the sleeve being angled as shown, so as to be adapted to rest on part of the structure 13 of a motor vehicle disposed in front of the windscreen so that the body and jet will be set at a desired angle to the windscreen.

The spring clip 8 is inserted over the body 1 from the lower end thereof and slipped up over the outer wall of the recess and when assembled will be concealed in the annular space between the sleeve 9 and the outer wall of the body 1.

The outer surface of the body is formed with a shoulder 11 adjacent to but spaced axially from the lower end 10 of the sleeve so that when the body is inserted through the aperture 12 in the structure 13 of the motor vehicle, it will be retained by the end 10 of the sleeve abutting one face of the structure 13 and the shoulder 11 engaging the opposite face.

The lower end of the body is formed with a series of shoulders 14 which may take the form of a screw thread for enabling the pipe to be assembled with the body to connect it with the source of liquid.

As shown in FIGURE 2 the assembly includes a hollow body 1a formed with a recess 2a housing a ball 5a which is retained by a clip 8a. According to the modification, the free end of the sleeve 9a is not angled; further the medial portion 1b of the hollow body has a thickened wall. This medial portion of the body is adapted to make a force fit in an aperture in a support.

In both embodiments the ball is capable of being adjusted by rotating it in the recess so as to permit the jet to be directed on to the surface to be sprayed.

I claim:

A spray device having a body of resilient plastic molded material, said body having a passageway therethrough for the passage of liquid to be sprayed, a recess at one end of the body and passageway, a movable ball, in said recess having a bore therethrough, a flexible wall, defining said recess, formed as a portion of the body and engaging said ball and retaining it in said recess, and a spring means engaging an outer portion of said wall and forming said wall recess in the body inwardly at a transverse plane to the longitudinal axis of the body between the largest diameter of the ball and the outer end of the enlarged recess to assist in holding the ball in assembly.

References Cited in the file of this patent

UNITED STATES PATENTS

| | | |
|---|---|---|
| 2,622,929 | Neufeld | Dec. 23, 1952 |
| 2,968,441 | Holcomb | Jan. 17, 1961 |

FOREIGN PATENTS

| | | |
|---|---|---|
| 686,923 | Great Britain | Feb. 4, 1953 |
| 865,845 | Great Britain | Apr. 19, 1961 |